May 10, 1966     R. P. RAMSEY     3,250,527

SHOCK ABSORBER

Filed March 26, 1964     2 Sheets-Sheet 1

INVENTOR.
RICHARD P. RAMSEY
BY Kenwood Ross
ATTORNEY.

May 10, 1966
R. P. RAMSEY
3,250,527
SHOCK ABSORBER
Filed March 26, 1964
2 Sheets-Sheet 2
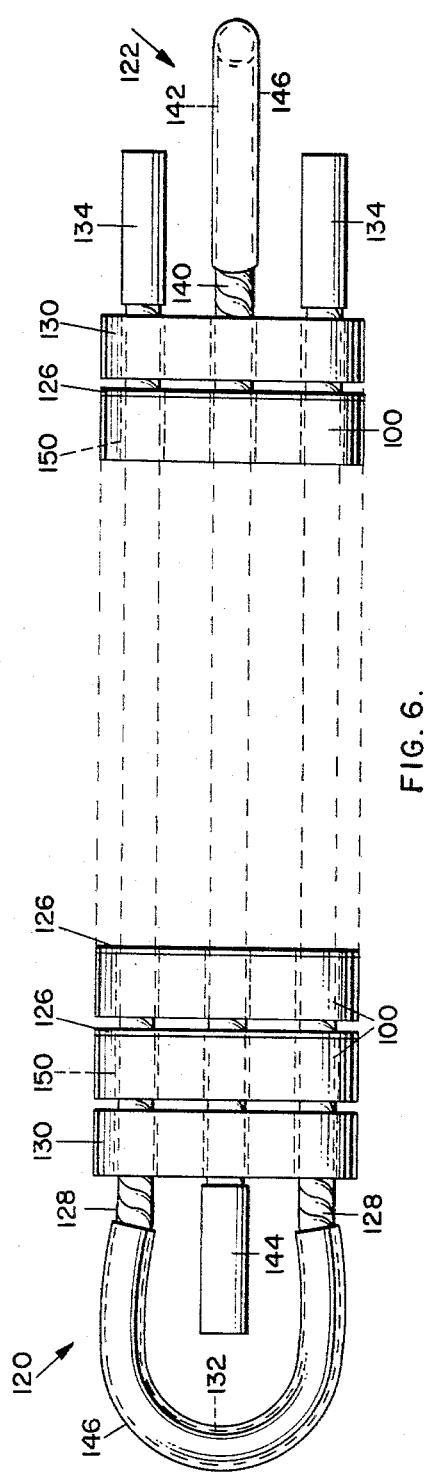
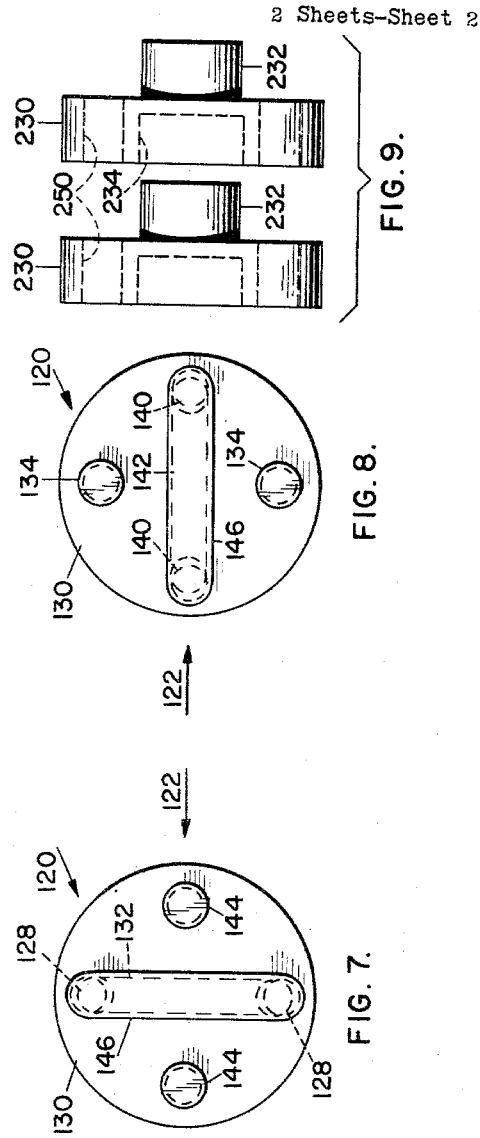
INVENTOR.
RICHARD P. RAMSEY
BY Kenwood Ross
ATTORNEY.

United States Patent Office 3,250,527
Patented May 10, 1966

3,250,527
SHOCK ABSORBER
Richard P. Ramsey, Wilbraham, Mass.
(1507 Westover Road, Morrisville, Pa.)
Filed Mar. 26, 1964, Ser. No. 355,023
8 Claims. (Cl. 267—70)

My invention relates broadly to a self-damping impact arrester characterized by its resiliency and flexibility and relative freedom from backlash in operational use.

In general concept, the invention envisions a shock-absorbing medium useful in minimizing shock loads upon steel cables, wire ropes and the like, it being appreciated that, under load, as in towing for example, such a line may be subjected to sudden fluctuations resulting from uneven starting or stopping with the consequent resulting strains frequently leading to breakage.

The achievement of this concept is via an arrangement of a multiplicity of columnated elastic and compressible or deformable symmetrical or asymmetrical (according to the characteristics desired) blocks, of square or rectangular or cylindrical or other configuration in cross section, which are coaxially aligned upon an assemblage of steel cables, wire ropes, or equivalent flexible load-bearing means, the number of cables or ropes comprehended for use therein being of an even number wherewith one half of the totality thereof may be employed for pulling in a certain direction and against a plate of metal or other suitably strong and rigid material at one end of the structure and the other half of the totality thereof may be employed for pulling in an opposite direction and against a similar plate at the opposite end of the construction, it being understandable that such plates would thereby be brought into confrontation with each other were it not for the fact of their separation by means of the interposed columnated blocks.

Stated otherwise, the assemblage of cables or ropes may be considered to constitute what may be termed a multi-rope sling in the sense of a sling comprising two or more cables, ropes, strands or other flexible tension members extended in side-by-side manner and connected at the ends of the sling to thimbles or equivalent, each such extended flexible member being passed around one of the thimbles to form a closed loop at one end and having its free ends distantly of the loop anchored in a suitable manner so that the respective parts of the cables or ropes between the thimbles and the anchoring means constitute the several tension members of the multi-rope sling.

The columnated elastic blocks are disposed between end plates, so that when the structure is subjected to load considerable of the imparted shock is absorbed so as to constitute an impact-arresting mechanism offering resilient means capable of taking up sudden strains under load conditions in manner such as to reduce the possibility of breakage of the materials of the structure itself, as well as to prevent damage to the instrumentalities to which the structure may be operationally connected.

One embodiment hereof teaches the use of a pair of looped wires or ropes, each having a pair of parallel reaches or runs with each of the reaches or runs having a free end extending through a respective opening in and terminating behind an associated end plate with means for preventing that end from running back through its respective opening. Pulling on the loops or thimbles of the pair of wires or ropes serves to cause the end plates of the pair thereof to move toward each other, thereby to decrease the distance therebetween and to compress the separating medium constituted by a multiplicity of columnated elastic blocks which are each suitably apertured so as to be sleeved upon the load-bearing wires or ropes of the pair thereof intermediate the end plates. Compressed by the tensile load on the wires or ropes, the mass of each block is induced to flow radially outwardly and inwardly relative to the axis of the supporting load-bearing medium. Such radial flow is directly proportional to the decrease in block thickness and is of a magnitude such as to effectuate a binding of the block upon its supporting wires or ropes, thereby to impede the free movement thereof and, more importantly, to minimize or damp any tendency toward oscillation. In this manner, not only resiliency is provided by the blocks but also damping is attained.

Damping, as here envisioned, refers to the checking of a motion due to friction so as to offer a diminishing amplitude of oscillation. As known, unless energy is supplied during each cycle, the amplitude of a vibrating system falls off at each successive oscillation by an amount commonly expressed in terms of the decrement or damping factor, which is the ratio of any one amplitude to that next succeeding it in the same sense or direction. As is also known, in any application where columnated elastic media are placed in compression, means normally must be provided to maintain the straightline rigidity of the column and hence to preclude its becoming eccentric and its collapse, which rigidity is realized herein by openings extending transversely through the elastic blocks of a column thereof for the sleeving of said blocks in coaxial alignment along and upon the load-applying members. Thereby, and advantageously so, the very members which apply the load are the members which provide alignment of the blocks by defining "tracks" along which the blocks are allowed to run.

A further salient object of the instant invention is to provide shock-absorbing means possessive of fail-safe characteristics and wherein the entire structure is flexible and yet virtually free from objectionable blacklash during any conversion between compression to tension conditions.

It is another object hereof to teach the concept of structures of the described character which can be of any desired size so as to meet the requirements for a wide range of loads, there being practically no limit to the size to which the structures can be designed.

Contemplated applications for the invention hereof include, among others, as a tension link in a cable or the like, as a link in a tow rope or tow chain, as a pulling member for a vehicle for absorbing the initial shock of acceleration or deceleration, as a shock load minimizing means when used as a link between a drop ball (headache or skull cracker) and its supporting line or as a component of a boom pendant supporting a crane boom or as used in a pile driver, as a car retarder for inducing or preventing movement of a railroad car along a track adjacent a loading device such as an elevator, and as a means for preventing bird-caging in wire rope (i.e. spreading of the rope components) frequently resultant from sudden load releases.

As respects the elastic component, rubber offers characteristics, such as to make it valuable for certain shock absorbing applications. However, in towing slings, there is an omnipresent threat of complete failure (i.e. load dropping) in the event of a failure of the bond between metal and rubber. The invention hereof comprehends the placement of a pluralistic number of elastic block members in compression in manner to provide a desirable fail-safe characteristic in the respect that, even should the load become excessive to the extent or extreme that the blocks are physically crushed, the sling would still not drop its load; the end plates merely being motivated toward juxtaposition with each other.

As a further refinement, the use of steel plates or other suitable non-resilient members which are cemented or vulcanized to one or both of the interfaces of the columnated elastic blocks is envisioned for use herein as means for overcoming the inherent tendency of the elastic material to deform or to bulge by restricting movement in bulge directions and attaining an improved uniformity of deformation, thereby exploiting recently acquired knowledge respecting "form or shape factor" in rubber design.

Mention may be made of a type of arresting means sometimes found on doors, but incorporating a coil spring. Said spring is placed in compression by means of a quartet of wires extendable axially and interiorly of the spring, a pair of the wires defining a loop, and there being one such loop at each of the opposite ends of the device. Operationally, when the two loops are pulled away from each other in opposite directions, the spring is placed in compression so as to effectuate a cushioning of the load, wherefor hysteresis occurs. Assuming a five pound load to be placed upon the device, and assuming further that five pounds is sufficient to compress the spring to one-half its initial or normal length, it will be initially observed that the five pound load, due to impact, will serve to compress the spring beyond said one-half its normal length, say to one-third its normal length, and as this is not its point of equilibrium, the spring will tend to rebound to a length greater than one-half its normal length and thereafter to continue to vibrate until the vibration has damped out due to internal friction.

Contrariwise, in the herein defined invention, resilient materials are employed which are possessive of characteristics such as to create their own damping effect wherefor hysteresis is virtually eliminated.

The above and other features and advantages will be more readily apparent from a consideration of the attached drawings wherein:

FIG. 6 is a view, in side elevation, showing a modified form of impact arrester employing circular end plates and elastic blocks;

FIG. 7 is a view, in end elevation, of the structure shown in FIG. 6 as seen from the left hand end thereof;

FIG. 8 is a view, similar to FIG. 7, but taken from the right hand end of the structure shown in FIG. 6; and FIG. 9 is an exploded view, in side elevation, of a pair of block members of still another modified form.

Figure 1:
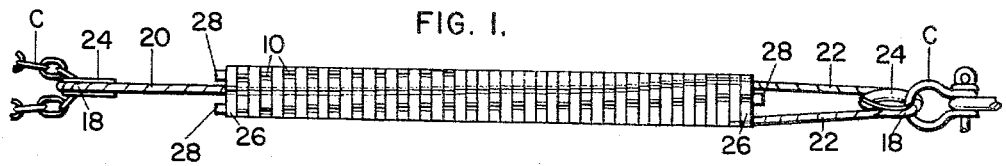
FIG. 1 is a view, in side elevation, of a preferred form of my impact arrester under load.

Referring first to the form of impact arrester shown in FIGS. 1–5 and to the reference characters I have employed therein, the structure embodying said invention will be seen to comprise a plurality of compressible rubber (natural or synthetic) blocks 10 of generally rectangular configuration, disposed in side-by-side confronting relationship on the parallel reaches or runs 20, 20 and 22, 22 of a pair of steel cables or wire ropes. Whereas reference has been made to block members as being formed of rubber (natural or synthetic), they may be formed of other types of elastic and compressible materials as well. Polyurethane, for example, is representative of a family of plastics which here finds practical application so that henceforth, wherever the phrases "blocks" or "elastic blocks" are employed, it will be understood that blocks made of rubber (natural or synthetic) or of other types of elastic and compressible materials are intended, same being of such consistency as to be compressible when under the full stress for which intended.

And whereas reference has been made to steel cables or wire ropes, the phrase "load-applying member" will be used henceforth to identify same and will be understood to mean steel cables or wire ropes or suitable equivalents.

Figure 1A:
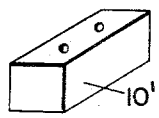
FIGS. 1A–1C are views, in perspective of elastic blocks adapted for use in the structure of the invention, a rectangular shaped block being shown in FIG. 1A, a cylindrical shaped block being shown in FIG. 1B, and a square shaped block being shown in FIG. 1C.
Figure 1B:
Figure 1C:
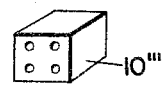
Figure 2:
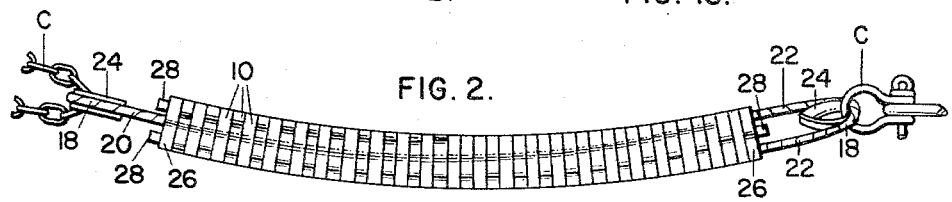
FIG. 2 is a view, similar to FIG. 1, showing the structure following load release.

One of such blocks 10, as shown in FIG. 1, is shown, in perspective view, in FIG. 1A, and will be observed to be of generally rectangular configuration. As will appear more fully hereinafter, in lieu of the rectangular shape depicted, the block may be disc-like in shape, circular in section, as shown in the case of block 10', in FIG. 1B, or may be square in section as shown in the case of block 10'', in FIG. 1C. Conceivably other shapes could be employed within the spirit of the invention.

Each load-applying member will preferably comprise a loop 18 intermediate a pair of parallel reaches or runs, 20, 20 in the case of one such load-applying member and 22, 22 in the case of the other such load-applying member. The loops of the pair of load-applying members will be oppositely facing, there being one such loop at each end of the structure.

Each loop 18 may be looped over a thimble 24 or the like disposed adjacent the respective end of the impact arrester and the thimble in each case could be adapted to receive therethrough such as a suitable coupling means C for interconnecting the opposite ends of the impact arrester one to the prime mover and the other to the load. Other suitable connecting means may be substitutable for the thimble and coupling means illustrated and such means as are shown are not to be considered as being part of the invention.

A rigid end plate 26 is provided at each of the opposite ends of the impact arrester. Each end plate is suitably apertured so as to be sleeved upon each of runs 20, 20 and 22, 22 of the load-applying members with the outer free terminals of the runs extending outboard of one of the end plates in manner such as to allow the fixed securement of a button 28 thereto so as to allow such end plate to constitute an anchoring means for the particular pair of runs and to preclude unwanted separation of the runs and said anchoring means. Alternatively, other connecting means, such as socket connections of well known form, could be employed for maintaining the stationary securement of a pair of the runs to its respective anchoring end plates.

Elastic blocks 10 are arranged in a column of pairs, with the blocks of one pair being arranged in vertical alignment as to each other and with the blocks of the next adjacent pair being arranged in horizontal alignment as to each other, such alternating arrangement being carried out for the entirety of the length of the column.

Each block of a vertically-aligned pair thereof is sleeved upon one of the runs 22, 22 of one of the load-applying members, and each block of a horizontally-aligned pair thereof is sleeved upon one of the runs 20, 20 of the other of the load-applying members, each block of each of the pairs thereof being suitably provided with an opening 30 extending transversely therethrough, and each said opening being of a diameter sufficient to allow the sleeving of the block upon and movement thereof along the respective run of its respective load-applying member.

Figure 3:
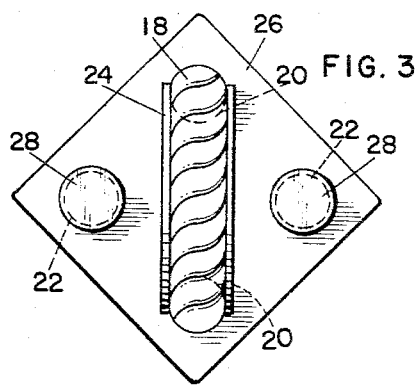
FIG. 3 is a view, in end elevation, of the structure shown in FIGS. 1 and 2, looking from the right hand end thereof, with the coupling means removed, and drawn to an enlarged scale.
Figure 5:
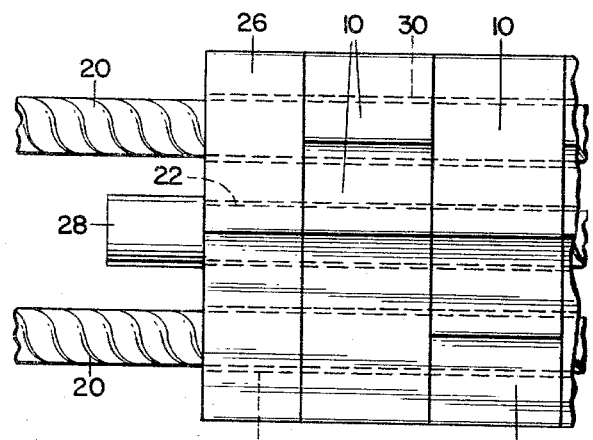
FIG. 5 is a fragmentary view, in top plan, showing the left hand end of the structure as shown in FIGS. 1 and 2, and drawn to another enlarged scale.
Figure 4:
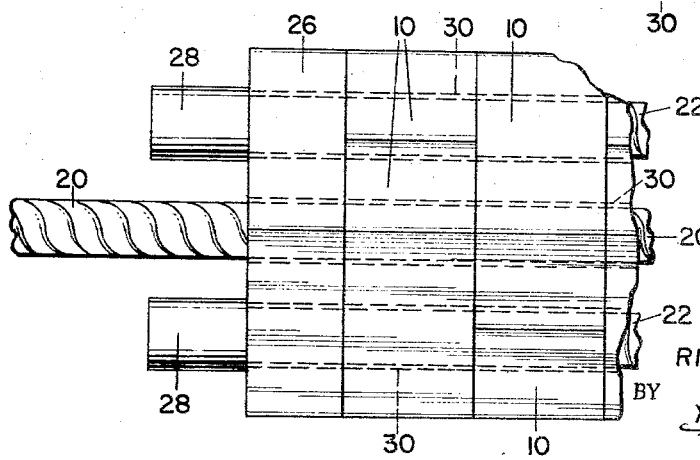
FIG. 4 is a fragmentary view, in side elevation, showing the end of the structure looking from the left hand end thereof, as shown in FIG. 1.

As will be observed by reference to FIG. 3, the axes of runs 20, 20 of one of the load-applying members are arranged in parallelism as to each other and in a plane which is transverse to the plane of the axes of parallel runs 22, 22 of the other of the load-applying members.

As a load is applied, by pulling on the loops or thimbles, the forces are such as to direct the end plates to move toward each other, thereby to compress the column of blocks constituting the separating media therebetween.

Openings 30 in blocks 10 will be of a size sufficient to permit the passage of a run of the respective load-applying member therethrough, as aforesaid, so that, as the blocks are compressed under load, they flow radially outwardly and inwardly relative to the load-applying members. The radial flow inwardly serves to produce a bending action upon the supporting cable or rope and, additionally as a damping action, the flow decreases the diameter of the opening so as to enhance this binding action, wherefor oscillation of the impact arrester is virtually eliminated.

It is to be appreciated that compression of a block member along the general axis of the applied load results in radially-outward deformation, but it is to be equally appreciated that radially-inward deformation also ensues, thereby to reduce the diameter of the opening through which the cable or rope passes with a consequent development of friction between the block member and the cable or rope and a concomitant damping action.

Such a feature may be controlled in the finer aspects of design by varying the relationship of aperture diameter and cable or rope diameter.

In the modified form of the invention shown in FIGS. 6-8 a plurality of disk-like elastic blocks 100 (only a few of which are shown for purposes of simplicity) are disposed in a side-by-side relationship on pairs of load-applying members indicated by 120 and 122.

Preferentially, but not obligatorily, blocks 100 may each have a metal disc or plate or equivalent non-resilient member 126 cemented or vulcanized to one or both of the side faces thereof. The use of such non-resilient members so secured to the interfaces of the blocks serves as a means for overcoming the inherent tendency of elastic material to deform or bulge. It restricts the movement in a bulge direction and allows an improved uniformity of deformation.

One load-applying member indicated by 120 is generally U-shaped and comprises a pair of longitudinally-extending spaced parallel reaches or runs 128 extending through aligned openings in blocks 100 and discs 126 on one axis thereof and extending outwardly through and outboard of a pair of spaced rigid end plates 130 provided at opposite ends of the structure to form a loop 132 at one of said ends, with the outboard free ends at the opposite of said ends each having a cap 134 fixedly secured thereto.

The other load-applying member indicated by 122 is likewise generally U-shaped and comprises a pair of longitudinally-extending spaced parallel reaches or runs 140 extending through other aligned openings in blocks 100 and discs 126 on one axis thereof and extending outwardly through and outboard of the pair of end plates 130 to form a loop 142 at one of said ends, with the outboard free ends at the opposite of said ends each having a cap 144 fixedly secured thereto.

If desired, protective sleeves or equivalent means 146 may be provided on each loop, there being one at each end of the structure, to protect the ropes when engaged with suitable means such as clamps or the like, not shown, during operational use, and interconnecting the structure at opposite ends thereof to the prime mover and to the load.

When the loops are grasped and pulled in opposite directions, the discs are compressed, but are restrained against radial bulge or deformation at their surface or at both surfaces by the metal discs on the interfaces thereof.

The openings provided in the discs and designated by numeral 150 will be of such size as to allow the passage of the load bearing members therethrough. When the discs are compressed under load, they tend to "flow" inwardly and outwardly or to "pulsate" as their thickness is decreased in manner to effectuate a degree of binding between the discs and the load bearing members, thereby impending the free movement of the discs whereby any tendency toward oscillation is minimized or damped.

With both embodiments of the invention, the total number of load-applying members must be even and so arranged that one-half of their number pull in one direction against one of the rigid end plates, while the other half of their number pull in an opposite direction against the other rigid end plate, all whereby an even force is set up throughout the structure.

As a further refinement, in FIG. 9, I have illustrated a pair of discs 230 having run-receiving openings 250 therethrough. Centrally of each such disc and on one side face thereof, an outwardly-extending annular boss 232 is provided, same preferentially being unitarily formed with the main body portion of its disc. Centrally of each such disc and on the opposite side face thereof, an inwardly-extending annular recess 234 is provided, same being of a diameter such as to allow the nesting therewithin of the boss 232 of the next adjacent disc, when said discs are columnated.

Damping arises from two sources: (1) the inherent molecular friction of the material from which the blocks are formed, and (2) the friction between the blocks and the load bearing members arising from inward deformation of the blocks under compression.

Conceivably, in certain applications, friction from the first named source would prove sufficient, wherefor the friction from the second named source could be eliminated by the provision of a bushing of brass or other soft antifriction material nested within the openings through which the load bearing members pass.

From the foregoing, it is obvious that I have provided means for placing a pluralistic number of elastic block members in compression to provide a fail-safe characteristic in the respect that, if the applied load becomes excessive so as to effect a crushing of the block members, the end plates would merely come into confrontation with each other and the sling would not drop its load.

Based on the foregoing, it will be apparent that I have provided a truly novel self-damping impact arrester with fail-safe characteristics, the entire device being flexible and virtually free from backlash.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The protection which is sought for this invention is covered by the language of the above specification and the spirit represented thereby. It should be appreciated that its utility and application extend beyond the particular type of structure illustrated and its broad scope and concept comprehend the useful and novel features set forth when combined with other mechanisms to allow the impact arresting feature.

The claims are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. A self-damping impact arrester comprising, a pair of load-applying members having parallel axes and being normally stationary in extended relationship to each other and being movable away from each other under the compressive force of a load, each of said load-applying members having a loop portion intermediate a pair of reaches having free terminals extending toward the loop portion of the other of said load-applying members, a column of coaxially-aligned apertured compressible blocks sleeved upon the reaches of said load-applying members, a pair of apertured end plates each disposed at one end of the column of said blocks and sleeved upon the reaches of said load-applying members, the free terminals of the reaches of each said load-applying member being fixed to the end plate of said pair thereof adjacent the loop of the other of said load-applying members.

2. In the self-damping arrester of claim 1, each of said compressible blocks having a metal plate secured to one of the interfaces thereof.

3. In the self-damping arrester of claim 1, including a thimble for the entrainment therearound of the loop portion of each of said load-applying members.

4. In the self-damping arrester of claim 3, one of said thimbles being adapted for connection to a prime mover and the other of said thimbles being adapted for connection to a load.

5. A self-damping impact arrester comprising, a pair of load-applying members having parallel axes, each of said load-applying members including a loop portion intermediate a pair of parallel run portions having free outermost terminals extending toward the loop portion of the other of said load-applying members, the plane of the axes of the run portions of one of said load-applying members being transverse to the plane of the axes of the run portions of the other of said load-applying members, a plurality of columnated pairs of apertured compressible blocks disposed in side by side confronting relationship and sleeved upon the parallel run portions of said load-applying members, the blocks of one pair being arranged in vertical alignment and the blocks of each adjacent pair being arranged in horizontal alignment for an alternating arrangement through the length of the column of said pairs of blocks with each block of a vertically-aligned pair being sleeved upon one of the run portions of one of said load-applying members and each block of a horizontally-aligned pair being sleeved upon one of the run portions of the other of said load-applying members, a rigid apertured end plate disposed at each of the opposite ends of the column of said blocks and sleeved upon each of the parallel run portions of said load-applying members with the adjacent free terminals of one of said load-applying members being anchored thereto.

6. A self-damping impact arrester comprising, an even-numbered plurality of load-applying members having parallel axes, each of said load-applying members having a loop portion outboard of the structure at one end thereof and intermediate a pair of reaches having free terminals extending inboard toward the opposite end of the structure, a column of coaxially-aligned apertured compressible blocks sleeved upon the reaches of said load-applying members, a pair of apertured end plates each disposed at one end of the column of said blocks and sleeved upon the reaches of said load-applying members, the free terminals of the reaches of each said load-applying member being fixed to the end plate of said pair thereof distantly of the loop portion of the respective said load-applying member, with one half of the number of load applying members having loop portions at one end of the structure for pulling the structure in one direction away from its associated end plate and one half of the number of load applying members having loop portions at the opposite end of the structure for pulling the structure in an opposite direction away from its associated end plate.

7. A self-damping impact arrester assembly of a construction adapted for contraction under compressive force comprising, a plurality of load-applying members each constituted by an intermediate looped portion and a pair of run portions extending in parallelism outwardly therefrom and terminating in free terminal portions, the plane of the axes of the run portions of one pair thereof being transverse to and intersecting the plane of the axes of the run portions of the other pair thereof with the loop portions being disposed at the opposite outermost extremities of the structure, a pair of end plates each being apertured for sleeving on each run portion of each pair thereof for movement toward each other during compression, the free terminal portions of each of said load applying members being secured to the end plate of said pair thereof nearest to the loop portion of the first-named said load applying member, a column of compressible blocks being apertured for sleeving on the reaches of the run portions of each pair thereof in separating manner between the end plates of said pair thereof, for movement together with the end plates of said pair thereof during compression.

8. In the self-damping arrester of claim 1, each of said compressible blocks having a centrally located outwardly-extending boss on one side face thereof and a centrally located complemental inwardly-extending recess in a side face opposite from said one side face, the boss of one block being nestably receivable in the recess of the next adjacent block.

References Cited by the Examiner

UNITED STATES PATENTS

| | | | |
|---|---|---|---|
| 75,814 | 3/1868 | Turner | 267—72 |
| 123,178 | 1/1872 | Jones | 267—70 |
| 172,479 | 1/1876 | Peters | 267—70 |
| 271,592 | 2/1883 | Baker | 267—70 |
| 503,408 | 8/1893 | Davis | 267—70 |
| 737,420 | 8/1903 | Krall | 267—70 |
| 855,899 | 6/1907 | Mercer | 267—72 |
| 1,744,551 | 1/1930 | Karcher | 267—70 |
| 1,750,917 | 3/1930 | Baker | 267—70 |
| 1,779,663 | 10/1930 | Cowell | 267—70 |
| 1,994,332 | 3/1935 | O'Neill | 267—70 |

FOREIGN PATENTS 837,233  6/1960  Great Britain.

ARTHUR L. LA POINT, *Primary Examiner.*

R. M. WOHLFARTH, H. R. FIELD,
*Assistant Examiners.*